US012238614B2

(12) United States Patent
Obst, Jr.

(10) Patent No.: US 12,238,614 B2
(45) Date of Patent: Feb. 25, 2025

(54) SYSTEM OF NETWORKED COMMUNICATION DEVICES FOR PROVIDING RECREATIONAL ACTIVITY SAFETY

(71) Applicant: SafeVelo, Inc., Temecula, CA (US)

(72) Inventor: Erich Paul Obst, Jr., Temecula, CA (US)

(73) Assignee: SafeVelo, Inc, Temecula, CA (US)

( * ) Notice: Subject to any disclaimer, the term of this patent is extended or adjusted under 35 U.S.C. 154(b) by 440 days.

(21) Appl. No.: 17/686,133

(22) Filed: Mar. 3, 2022

(65) Prior Publication Data

US 2022/0286816 A1   Sep. 8, 2022

Related U.S. Application Data

(60) Provisional application No. 63/156,049, filed on Mar. 3, 2021.

(51) Int. Cl.
*H04W 4/02* (2018.01)
*H04W 4/021* (2018.01)
*H04W 4/029* (2018.01)

(52) U.S. Cl.
CPC ........... *H04W 4/029* (2018.02); *H04W 4/022* (2013.01)

(58) Field of Classification Search
CPC .............................. H04W 4/022; H04W 4/029
See application file for complete search history.

(56) References Cited

U.S. PATENT DOCUMENTS 9,794,755 B1 * 10/2017 South .................... H04W 4/021

* cited by examiner

*Primary Examiner* — Nader Bolourchi
(74) *Attorney, Agent, or Firm* — Sandberg Phoenix & von Gontard, P.C.

(57) ABSTRACT

A method for providing information sharing among user devices for improving recreationalist safety through networking of user devices includes communicating device location based on an activity status identifier and the location of the devices.

14 Claims, 8 Drawing Sheets

SYSTEM OF NETWORKED COMMUNICATION DEVICES FOR PROVIDING RECREATIONAL ACTIVITY SAFETY

CROSS-REFERENCE TO RELATED APPLICATIONS

This application claims the benefit of U.S. Provisional Application No. 63/156,049, filed Mar. 3, 2021, the entirety of which is hereby incorporated by reference herein.

STATEMENT REGARDING FEDERALLY SPONSORED RESEARCH

Not Applicable.

BACKGROUND

This invention relates generally to improving safety among nearby bicyclists, joggers, drivers, and others, and more particularly, pertains to systems and methods of networked communication devices for providing recreational safety. While the disclosure is specifically described in terms of certain specific activities, those skilled in the art will recognize the wider applicability of the inventive principles disclosed hereinafter.

Joggers, bicyclists, walkers, and other pedestrians and people engaging in recreational activities generally face danger from a variety of sources while engaging in their recreational activities. For example, people engaging in recreational activities can face danger from nearby drivers of automobiles who are inattentive. Such inattentive drives can collide with bicyclists, joggers, walkers and the like when such recreationalists cross paths with drivers. This can occur, for example, at crosswalks, where roads include bicycle paths, when bicyclists use roadways, where jogging/walking paths abut roadways, and the like.

Recreationalists also face danger from sources other than automobiles. For example, bicyclists, joggers, walkers, and the like face danger from damaged paths, obstructed paths, overcrowded paths, and the like. Recreationalists can be exposed to danger or potential danger from environmental threats as well. For example, recreationalists can face dangerous weather conditions. A park or woodland can also have dangerous wildlife or other potential dangers.

What is needed is a system and method for information sharing and providing warnings that decreases the dangers faced by recreationalists. Existing systems that can be used to increase recreationalist safety suffer from a variety of problems. For example, websites that provide information to recreationalists do not provide real-time or near real-time data and do not share the locations of nearby fellow recreationalists such that recreationalists can be assured that an area is safe due to concurrent use by other recreationalists. Such websites can also fail to allow for user input such as photographs of dangers that can be location tagged.

Existing systems and methods for location sharing also suffer from a variety of problems. These systems and methods are not tailored for use by recreationalists. For example, these systems and methods do not provide location information cross-modally. Drivers are unable to see upcoming bicyclists and other recreationalists and therefore are not given a warning to be alert for recreational activity. Furthermore, existing systems and methods of location sharing suffer from inefficiencies in data usage which impair the functioning of the computing systems used. Existing systems use a great deal of location data in order to provide location information. This transmittal and storage of data puts strains on existing computer systems and causes users to utilize more data than necessary and therefore bear a higher data service cost than necessary.

BRIEF SUMMARY

Briefly, systems and methods are disclosed herein which provide for increased safety for recreationalists. The systems and methods described provide networked communication devices for providing recreation activity safety. Each device collects location data for the position of the device itself. For example, each device includes a global positioning system (GPS) device that determines the device's location using the network of GPS satellites. Each device determines independently if the location of the device has changed beyond a predetermined threshold. Upon determining that the device has moved beyond the predetermined threshold, the device communicates its new location to a server. For example, the device uses a wireless internet connection or cellular data connection to transmit the information to the server. The server uses the location information from each device to determine which devices are nearby each other (e.g., within a predetermined distance). The devices also transmit a status identifier to the server corresponding to whether the user of the device is engaged in a recreational activity (e.g., jogging or cycling). This status identifier is manually set by the user of the corresponding device (but can reset automatically after a predetermined amount of time).

In response to receiving location information from a device, the server stores, at least, the location, a device identifier, and a status identifier in a database. The server uses the location data received to identify other nearby devices based on their location data and determines if the nearby devices have a status identifier corresponding to a recreational activity (e.g., jogging or cycling). If the identified nearby devices have a status identified corresponding to a recreational activity, the server sends the corresponding location data to the initial device that provided location information. This allows for the initial device to display, to its user, icons indicating the location of nearby devices. This occurs regardless of whether the initial device has a status indicator corresponding to a recreational activity. This allows for all devices to receive and display the location of nearby devices regardless of whether the displaying device is used by a user engaged in a recreational activity. And, location data for nearby devices are only displayed if the nearby device is currently being used by a user engaged in a recreational activity (e.g., with a corresponding status identifier).

DESCRIPTION OF THE DRAWINGS

In the accompanying drawings which form part of the specification.

In the figures, corresponding reference characters and symbols indicate corresponding parts throughout the several views of the drawings.

DETAILED DESCRIPTION

Figure 1:
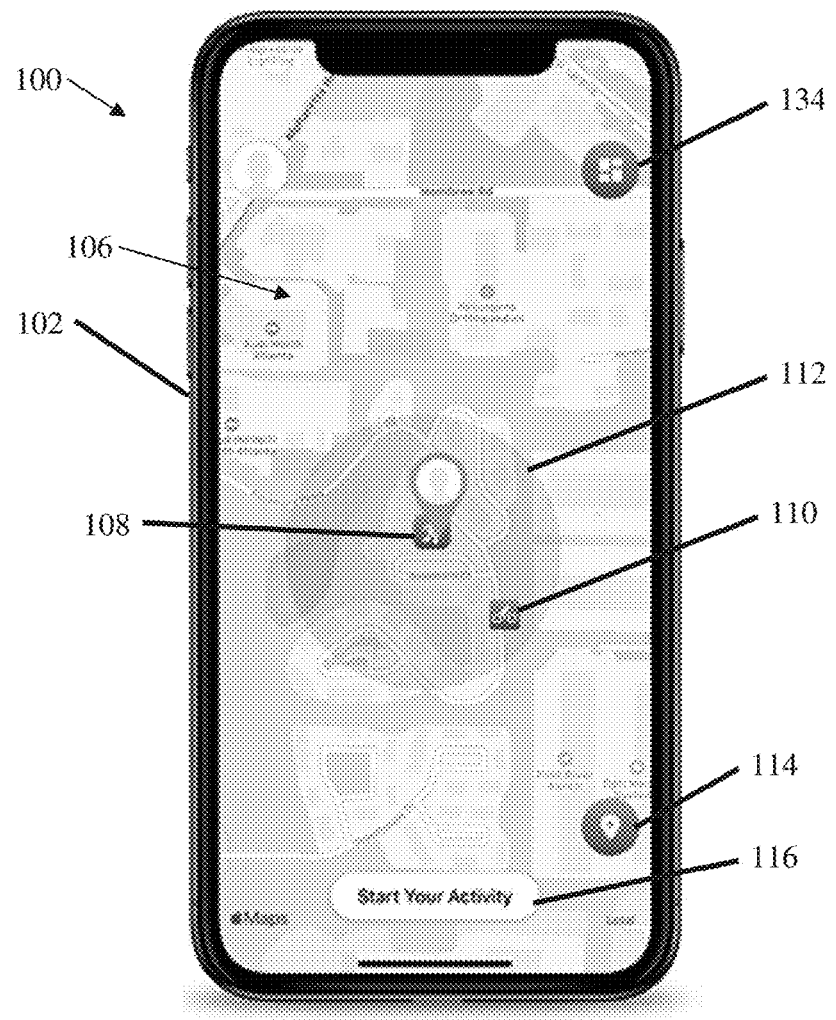
FIG. 1 is an illustration of a user device showing an application running thereon and displaying nearby users engaged in recreational activities.

The following detailed description illustrates systems and methods for networked communication devices for providing recreation activity safety by way of example and not by way of limitation. The description enables one skilled in the art to make and use the systems and methods, describes several embodiments, adaptations, variations, alternatives, and uses of the system, including what is presently believed to be the best mode of making and using the system. Additionally, it is to be understood that the disclosed systems and methods are not limited to the details of construction and the arrangements of components set forth in the following description or illustrated in the drawings. The systems and methods disclosed are capable of other embodiments and of being practiced or being carried out in various ways. Also, it is to be understood that the phraseology and terminology used herein is for the purpose of description and should not be regarded as limiting.

Referring generally to FIGS. 1-8, a system 100 and associated methods provide increased safety to recreationalists by networking user devices. The system 100 utilizes a network of a plurality of user devices 102 used by recreationalists and others which communicate with one or more server(s) 104 for managing communication of data between the user devices. For example, user devices can include smartphones, cell phones, personal digital assistants, smartwatches, glasses with integrated computing devices, or other similar devices. The user devices 102 each run an application 106 thereon for providing communication of information (e.g., the device location and the status of the user's recreational activity) to other user devices 102 via the server(s) 104. The information is not communicated directly, but is aggregated, processed, and then transmitted to select user devices 102 by the server(s) 104. This allows for the server 104 to determine which user devices 102 are nearby each other and which are engaged in an active recreational activity (e.g., bicycling, jogging, walking, etc.). The server 104 then transmits to user devices location information and status information for nearby user devices engaged in a recreational activity. This allows for the receiving user device 102 to display the information to its user.

The server 104 is also capable of receiving, aggregating, and transmitting additional information. For example, the server 104 can receive spotted activity information from users who provide information through the application running on their user device 102. This can include location information and a status identifier corresponding to a type of activity spotted (e.g., bicycling, jogging, etc.). The server 104 can provide this information to other user devices 102. The server 104 can also receive photographs from a user using the application running on their user device 102. The photographs can also have location information associated with each photograph. The server 104 can also provide such photographs to other user devices 102.

As explained in greater detail later herein with respect to at least FIGS. 7-8, the system 100 and its associated method of operation provides significant benefits in providing for recreationalist safety and provides significant benefits over other types of communication systems. The system 100 and associated method of operation provide a benefit to the safety of recreationalists. Recreationalists using the system 100 are able to see nearby recreationalists engaged in a recreational activity. This allows for users to know that an area is safe for recreational activities because others are currently using it for such. The system 100 also provides for the location of users active in recreation to have their location presented to others nearby who have the application running on their device. For example, a driver who has the application running on their user device 102 can receive location information and a graphical display can display the location for nearby recreationalists who are currently involved in a recreational activity. This allows for drivers to take additional caution when nearby recreationalists thereby providing increased safety for recreationalists.

The system 100 further provides for specific benefits which improve the computational functioning of the networked user devices 102 and the server(s) 104. The applications running on user devices 102 independently determine if the corresponding user device has moved beyond a predetermined distance from its last location reported to the server 104. This predetermined distance (e.g., 10 meters) allows for the device 102 to conserve the use of data and the resulting less frequent providing of data to the server 104 allows the server 104 to conduct fewer computations. At the same time, functionality is not lost as location information is still accurate enough to provide the functions described herein. The use of less data input to the server 104 also allows for faster response time by the server 104 in that fewer calculations overall are needed. The use of status identifiers also allows for the application on each user device 102 to indicate to the server 104, when transmitting location information intermediately, if the user is engaged in a recreational activity. The server 104 in turn only reports the location of users who are both nearby and engaged in a recreational activity. Again, this reduces the amount of data that needs to be communicated between the server 104 and user devices 102. Further, this reduces clutter on the graphical user interface (GUI) of the application by displaying only relevant nearby users instead of all nearby users regardless of whether they are active in a recreational activity. At the same time, non-active users can receive information which is displayed so that they can be cautious in the vicinity of active recreationalists (e.g., while the user is driving nearby to recreationalists). In this manner, the computational function, data transmitting function, user experience, and safety of recreationalists are all improved over other network systems.

Referring now to FIGS. 1-6, an exemplary one of the plurality of user devices 102 is depicted showing various GUI elements of an application 106 running thereon. The application running on each user device 102 provides for the GUI elements and corresponding touch screen interaction using suitable techniques know to those of skill in the art.

For example, the application is an application suitable for execution by an operating system such as iOS for Apple® user devices 102, Android® for suitable user devices 102, or any other suitable operating system. The application is programmed using Swift, UIKit, Java, C++, Android Native Development Kit, or other suitable programming languages and tools.

Each user device 102 is typically an iPhone® or phone running an Android® operating system. Each user device 102 can be any portable computing device with the ability to determine its location and to communicate wirelessly using an Internet connection and suitable protocol. This can include smart watches, glasses/goggles/sunglasses with an integrated computing device, a wearable camera or videorecorder, personal digital assistant, or the like. Each user device 102 includes at least a processor (e.g., a general processing integrated circuit such as an Apple® A9 processor, application specific integrated circuit or ASIC, Snapdragon® 801 processor, or other suitable processor known to those skilled in the art) and memory (e.g., random access memory or RAM, memory caches, database storage, general memory, hard disk memory, solid state drive memory, NOR flash memory, NAND flash memory, or other suitable memory known to those skilled in the art). The processor and memory provide the execution of the application specified herein using techniques known to those skilled in the art for running an application using an operating system, processor, and memory devices.

Each user device 102 further includes components for communicating wirelessly. This includes components for cellular communication of voice, data, short message service, and/or Internet communication. Cellular communication can be achieved using system on a chip devices such as a processor adapted for cellular communication and coupled antennas. For example, cellular communication can be achieved using Qualcomm® or Apple® chips and antennas adapted for 4G, 4G LTE, 5G or other similar suitable communication standards. Communication can also be achieved using components for other suitable wireless communication such as processors and antennas for implementing a WiFi communication protocol and standard (e.g., 802.11a, 802.11n, or like standard), a Bluetooth communication protocol and standard (e.g., Bluetooth 5.0, or like standard). These standards can be used to communicate with an additional device allowing for pass through internet communications. In other words, each user device 102 can communicate with a further device using Bluetooth and the further device provides a bi-directional internet connection using additional communication equipment (e.g., a cellular communication device).

Each user device 102 further includes one or more systems for determining the location of each respective device 102. For example, each user device 102 includes a global positioning system (GPS) or like device for communicating with the Global Position System satellite system, Global Navigation Satellite System, or other satellite navigation system. Each user device 102 includes a processor, ASIC, antenna, or like hardware for communicating with GPS satellite systems using a suitable protocol. For example, each user device 102 can include a Broadcom® BCM47755 chip or other suitable system for determining the location of the respective user device 102 using GPS satellite systems and methods known to those of skill in the art. Each user device 102 can also determine its location using, in whole or in part, cellular communication enabled by the equipment previously described. For example, each user device 102 can determine the location of the respective device using triangulation between a plurality of cellular communication towers with which the respective user device 102 is in communication. Triangulation can be used to determine the location of the respective user device 102 using a suitable technique known to one of skill in the art (e.g., cell identification, triangulation, advanced forward link trilateration, timing methods, signal strength methods, or any other suitable technique). Each user device 102 can also determine its location using, in whole or in part, inertial navigation components and techniques. For example, each user device 102 can include accelerometers, inclinometers, gyroscopes, magnetometers and the like. The application running on the respective user device 102 can use any suitable inertial navigation techniques based on the data from these and/or other sensors to determine, in whole or in part, the location of the respective device.

Referring now specifically to FIG. 1, the application 106 running on the each user device 102 includes a display of the location of the respective user device 102 and nearby recreationalists. As discussed later in greater detail with respect to FIGS. 7-8, any one of the plurality of user devices 102, referred to herein as the first user device 102, reports its location to the server 104 and in response receives location information for nearby active user devices 102 (the first user device 102 reports its location triggering the response on startup of the application and when movement beyond a predetermined threshold is detected by the device itself). Using the received location information and status identifier information (e.g., corresponding to jogging or bicycling), the application 106 causes icons to be displayed on a map showing the nearby active devices. The icons correspond to the type of activity reflected in the status identifier information. For example, a jogger icon 108 is displayed for nearby user devices 102 that report to the server 104 that the respective user is engaged in a jogging activity. Likewise, a bicycling icon 110 is displayed for nearby user devices 102 that report to the server 104 that the respective user is engaged in a bicycling activity.

The icons are displayed on a visual representation of a map. The GUI display is handled using any suitable technique known to those of skill in the art (e.g., bitmap masking). The map background image can be achieved by interfacing with a suitable application programming interface (API) for a mapping service (e.g., Google Maps, Apple Maps, or the like). The map is centered based on the location information provided by the respective user device 102 to the mapping service through and using the API. The map can be scalable by the user.

The application also displays a circular icon 112 indicating the range in which the application is displaying other active user devices. This icon corresponds to the predetermined distance that defines nearby user devices 102 and for which the server 104 uses when comparing device location information to determine which user devices 102 are nearby for reporting location information and status identifier information in response to receiving a location update from a first user device 102. In some embodiments, this predetermined distance is set as one mile. It has been determined through experimentation that a predetermined distance of a radius of one mile provides sufficient warning to a user of the first user device 102 of upcoming recreationalists given the typical speeds of recreationalist activity and the speeds of other activities (e.g., driving) such that the user of the first user device 102 is sufficiently warned that recreationalists are ahead. The one mile limit also improves the operation of the server 104 and the first user device 102 in that the amount of data transmitted between the two and the processing required is reduced relative to a larger area (e.g., a larger radius of, for example, 10 miles, would include much more nearby user devices 102 and require the associated data to be transmitted to the first user device 102 and then displayed by the first user device 102).

In some embodiments, the respective user of each user device 102 can select the predetermined distance within an allowable range (e.g., between a quarter of a mile and 5 miles). This selection is transmitted to the server 104 which it stores in relationship to the respective user device 102. Thus, when the server 104 receives a location update from a first user device 102 the server queries the database to identify the selected predetermined distance and uses this distance to determine nearby user devices for which to return, to the updating first user device 102, location and status identifier information. Any individual user can update their selected predetermined distance by selecting it through the application 106 GUI, where the application then causes the respective user device 102 to transmit a message to the server 104 to update its stored value of the distance for the user device 102.

The GUI of the application 106 can include a button 114 that allows a user to manually cause their user device 102 to determine its location and then report that location to the server 104.

The GUI of the application 106 includes a button 116 for "start your activity." This button or an equivalent GUI element (e.g., a menu, drop down, or the like), allows a user to open an additional GUI screen or element for starting an activity (i.e., allowing for the user to update the status identifier associated with their user device 102).

Still referring to FIG. 1, in some embodiments, the user can interact with a displayed icon 108, 110 and see the username of the user associated with the icon. In some embodiments, the application 106 displays a notification (e.g., of the type typical to Apple® iOS or Google® Android) when the system 100 determines that a recreationalist is nearby. For example, as the user of a first user device 102 moves or other recreationalists move relative to the first user device 102 such that they become nearby, then the system 100 causes the application 106 to display a notification.

Figure 2:
FIG. 2 is an illustration of a user device showing the application running thereon displaying an interface for selecting a recreational activity in order to set a status identifier for the device.

Referring now to FIG. 2, a GUI/screen is depicted which allows a user to provide input regarding whether the user is currently engaged in a recreational activity. The GUI allows a user to select a particular recreational activity for which to update the user device's status identifier. The user can select between two or more buttons corresponding to different types of activity for which status identifiers correspond. The user can select a button 118 corresponding to jogging or a button 120 corresponding to cycling. This sets the status identifier flag locally within the application 106. In other embodiments, different GUI elements (e.g., a drop-down menu) and/or other status identifiers (e.g., walking) can be used and selected from.

After selecting a status identifier value that is set locally, the user selects a time period using a GUI element such as a selector wheel 122. In other embodiments, other GUI elements can be used (e.g., a field, buttons, etc.). The application 106 tracks the time selected through the selector wheel 122 once the user "starts" the activity. Once the time expires, the application 106 sets the status identifier to a null value and causes the user device 102 to transmit to the server 104 an update including status identifier with the null value. This causes the server 104 to update its value for the user device status identifier to correspond to the end of the recreational activity.

The application includes a start button 124. Once the user has selected the start button 124, the application 106 starts a countdown with a value equivalent to that previously selected in order to trigger the null value setting and transmitting of the status identifier. Selecting the start button 124 also immediately causes the application 106 to set the local value of the status identifier to that previously selected (e.g., using the buttons 118, 120) and cause the user device 102 to transmit to the server 104 the status identifier value. The application 106 can further cause the user device 102 to transmit location information corresponding to the current location of the user device along with the status identifier. Upon selecting the start button 124, the application 106 also causes the GUI to display a current activity screen. In an alternative embodiment, the server 104 tracks the time period, or activity time, rather than the user device 102 and application 106. In such an embodiment, once an activity is started using the start button 124 the application 106 also causes the user device to transmit to the server an activity time value that the server 104 stores and uses to update the value to null of the activity status identifier when the time elapses.

Figure 3:
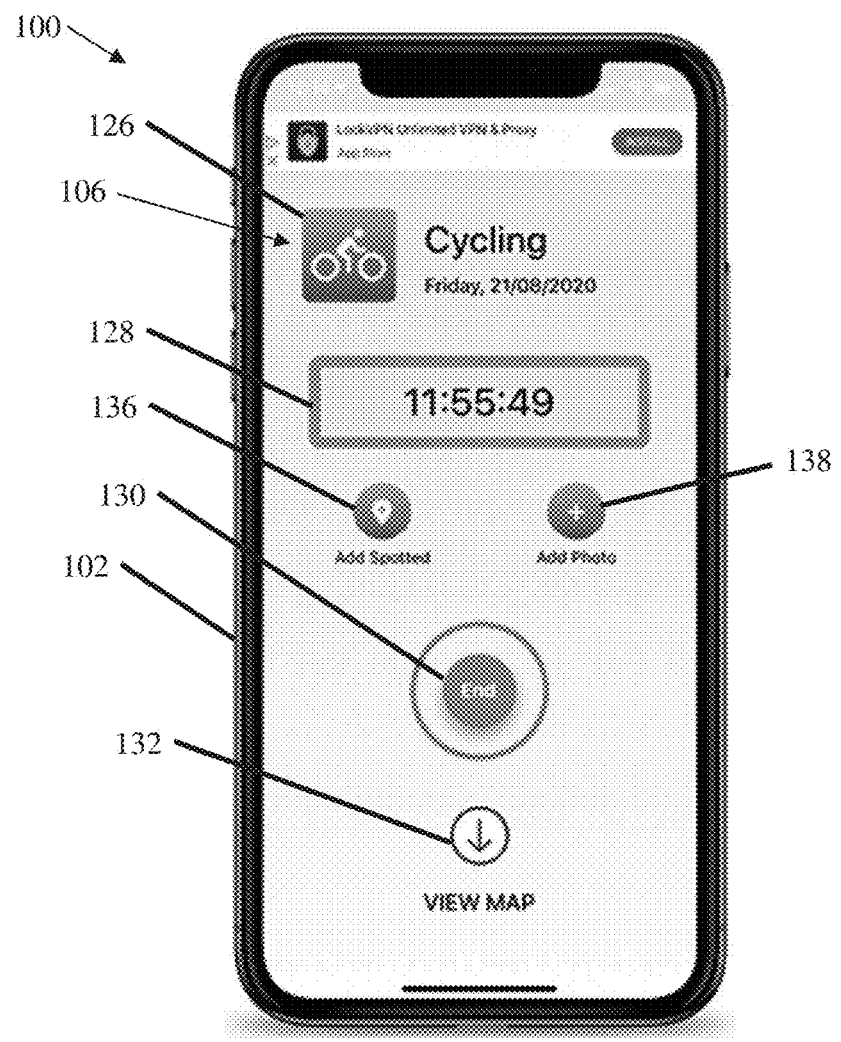
FIG. 3 is an illustration of a user device showing the application running thereon displaying an interface for an ongoing recreational activity.

Referring now to FIG. 3, a current activity screen of the application 106 is shown according to one embodiment. This portion of the GUI displays an icon 126 indicating the status identifier value (e.g., a bicycle icon in the displayed example, or a jogger, etc.). Also displayed is the remaining time left in the activity with a countdown 128. In some embodiments, this GUI element is interactable (e.g., as a button) to add additional time to the activity. If additional time is selected (e.g., using one or buttons to add a predetermined amount of time, resetting the time using a selector wheel or input field, etc.), the countdown timer 128 is updated to reflect the added time and the application 106 correspondingly updates the countdown until the status identifier value is set to null and transmitted to the server 104. In some embodiments, the application 106 displays a notification when the activity time is nearing zero. The notification allows a user to add additional time in any suitable manner (e.g., through a GUI element such as button).

In some alternative embodiments where the server 104 tracks the time remaining in an activity and then automatically resets the server side stored activity status identifier value when the activity time elapses, when a user adds time using the GUI of the application 106 the application 106 causes the user device 102 to transmit a message to the server 104 instructing the server 104 to update the server stored activity time value.

The GUI also includes an "end" button 130. The end button 130, when interacted with by a user, causes the application 106 to update the activity status identifier locally to a null value and set the activity timer value to zero. The end button, when interacted with by a user, also causes the application 106 to instruct the user device 102 to transmit to the server 104 the activity status identifier, now set to a null value. This causes the server 104 to update the database value for the user device 102 corresponding to the activity status identifier to a null value. As a result, the location of the user device 102 will not be transmitted to other user devices 102 that the server 104 determines to be nearby.

The GUI further includes, on the activity screen depicted in FIG. 3, a view map button 132. The view map button 132, when interacted with by a user, causes the application 106 and the user device 102 to display the map depicted in FIG. 1 and discussed with reference thereto. The user can then see nearby recreationalists. Referring briefly to FIG. 1, the user can navigate between different "screens" of the application 106 (depicted in the various FIGS.) using a menu button 134 (e.g., that provides a drop-down list) or similar GUI element.

Referring again to FIG. 3, the GUI includes an "add spotted" button 136. This button 136 brings up further GUI elements (e.g., a screen) to allow a user to identify spotted recreationalists (e.g., joggers or bicyclists). These additional GUI elements and the associated features are shown and discussed with reference to FIG. 4 discussed later herein. Still referring to FIG. 3, the GUI includes an "add photo" button 138. The add photo button 138 brings up further GUI elements (e.g., a screen) to allows a user to upload sharable photographs (e.g., with geographic information corresponding to where the photo was taken). These additional GUI elements and the associated features are shown and discussed with reference to FIG. 5 discussed later herein.

Figure 4:
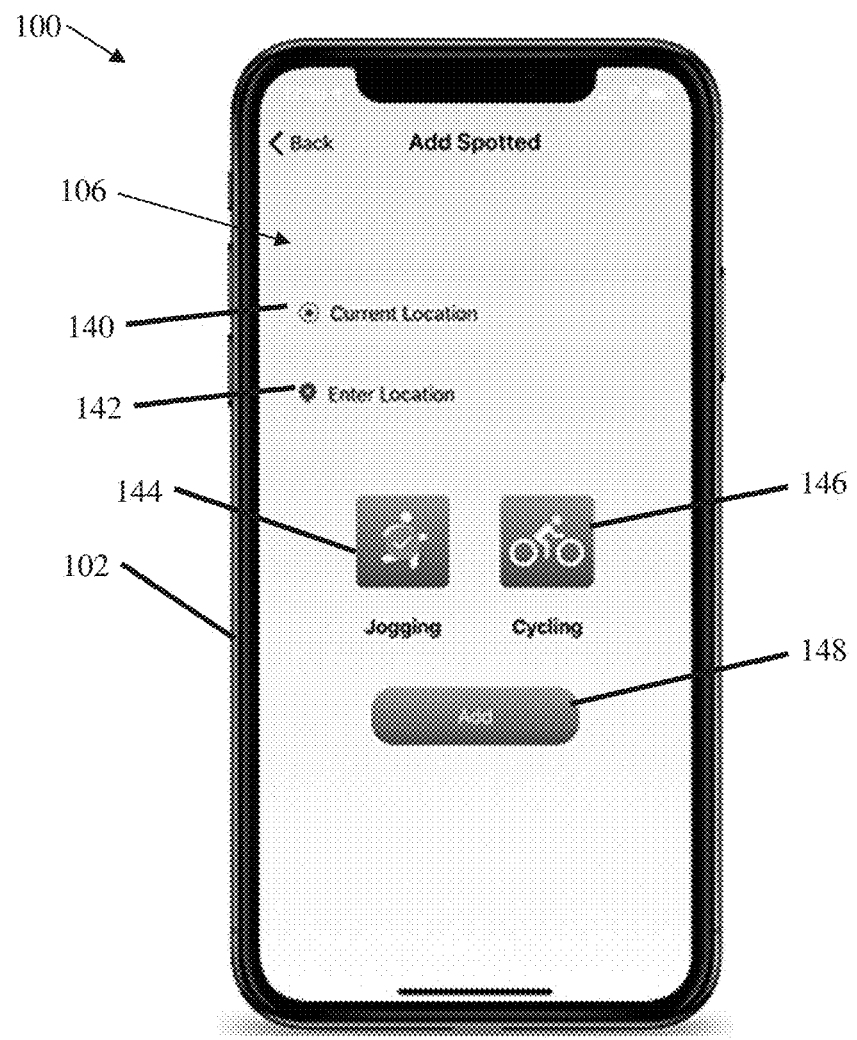
FIG. 4 is an illustration of a user device showing the application running thereon displaying an interface for adding data for a spotted recreationalist.

Referring now to FIG. 4, GUI elements for adding a spotted recreationalist are shown. The user can select a "current location" button 140 to tag the spotted activity/recreationalist with a geographic location. When a user interacts with the "current location" button 140, the application 106 causes the user device 102 to determine the location of the user device (e.g., using a GPS system as previously discussed). The location information can also be provided manually by the user using the field 142. The field 142 can use an autocomplete feature of the type currently used and known to those of skill in the art. The user can also select the type of recreational activity that has been witnessed. For example, the GUI displays a jogging button 144 and a cycling button 146. Upon interacting with the corresponding button, the application 106 indicates the selection by overlaying a selected indicator (e.g., a checkmark image). The location information and status identifier value received through the application 106 are stored locally on the user device 102 temporarily and are associated with an identification of the activity spotted. For example, the identification can be a identification based on the identity of the user device (e.g., a unique username, media access control MAC address, etc.) with a suffix corresponding to the instance of the activity spotted (e.g., an alphanumeric suffix).

The GUI further includes an "Add" button 148. When a user interacts with the add button 148, the application 106 causes the user device 102 to transmit a message to the server 104 including an identification, activity status identifier, and location information. In some embodiments, the server 104 includes spotted recreationalists in the information transmitted to user devices 102 for display on the map as shown in FIG. 1. In some embodiments, spotted activity is displayed identically to self-reported recreational activity (through the user devices that are active, i.e., an activity has been started as described with respect to FIG. 2). In alternative embodiments, spotted activity is displayed with a differentiated icon (e.g., a different color, transparency, boundary, design, etc.).

Figure 5:
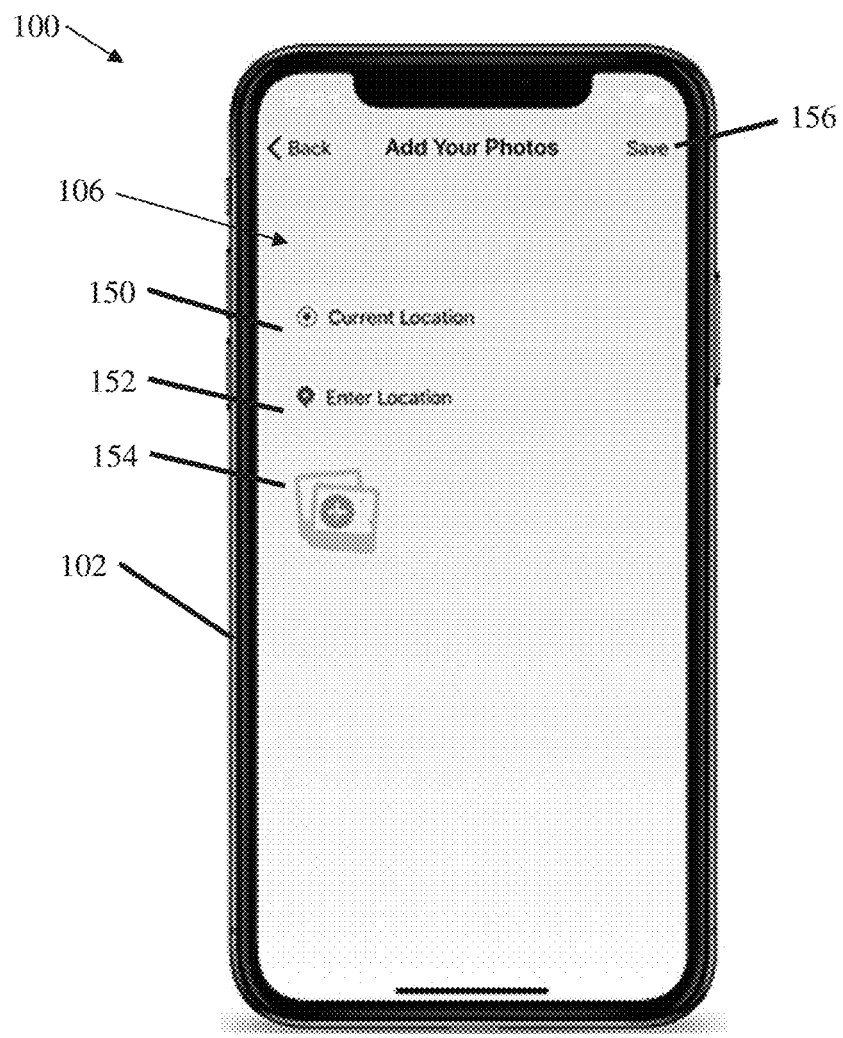
FIG. 5 is an illustration of a user device showing the application running thereon displaying an interface for adding a location related photograph.

Referring now to FIG. 5, GUI elements are shown for adding a photo for sharing between user devices 102 using the application 106 and the server 104. The user can select a "current location" button 150 to tag the spotted activity/recreationalist with a geographic location. When a user interacts with the "current location" button 150, the application 106 causes the user device 102 to determine the location of the user device (e.g., using a GPS system as previously discussed). The location information can also be provided manually by the user using the field 152. The field 152 can use an autocomplete feature of the type currently used and known to those of skill in the art. The user can select a photo to upload by interacting with the button 154. When a user interacts with the button 154, the application displays a file browsing interface of the type know to one of skill in the art that allows for a user to select a photo stored in memory. The button 154 can also allow a user to take a photo by initializing a photo application also running on the user device using any suitable technique known to one of skill in the art. Once the photo is selected and the user selects the "save" button 156, the application 106 causes the user device 102 to transmit the photo and location information to the server 104. The server 104 then makes the photograph receivable by other user devices 102 when those user devices 102 browse and request the images using the application 106.

Figure 6:
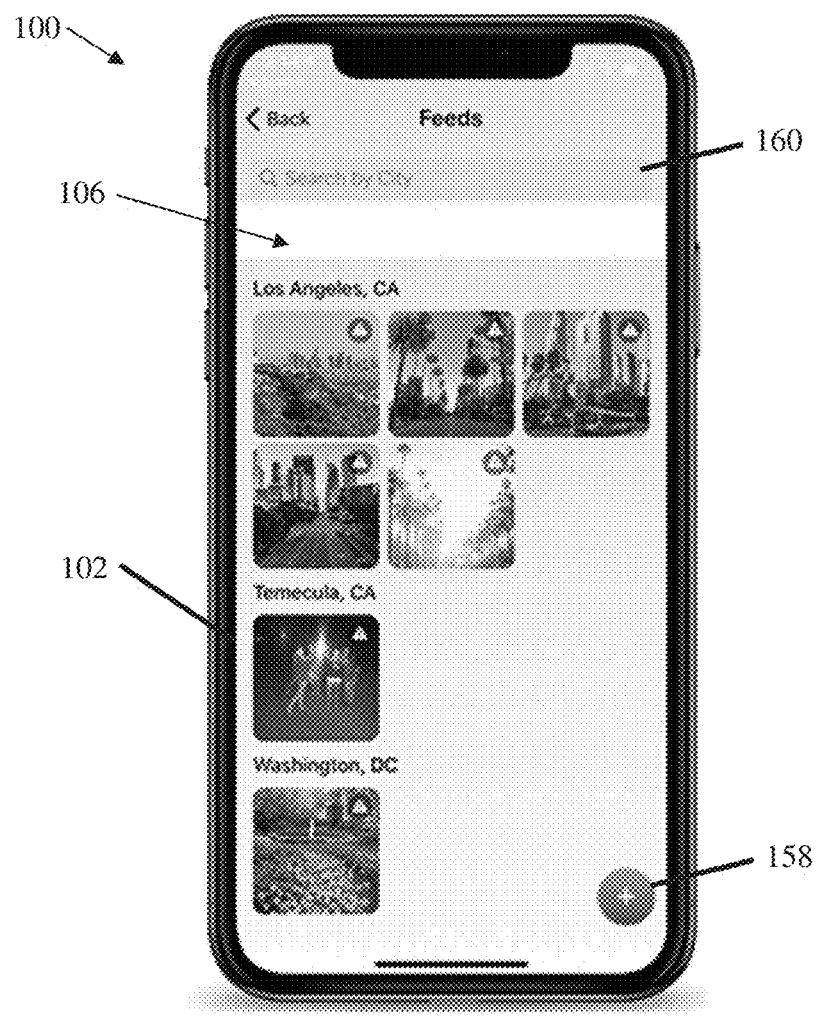
FIG. 6 is an illustration of a user device showing the application running thereon displaying an interface for viewing location related photographs uploaded by other users.

Referring now to FIG. 6, GUI elements are shown for browsing photos uploaded by users. The photos are grouped by geographic location and can be navigated by selecting certain images or locations which are displayed as GUI elements such as buttons. User can select the "+" button 158 to be prompted to add a photograph using the GUI elements described with respect to FIG. 5. The GUI elements also include a search bar 160 that allows a user to filter displayed images based on their associated location information.

Referring now to FIGS. 1-6 generally, the functions of the application 106 including the display of information and interaction with the application through the GUI and the interaction with the server 104 are carried out through execution of instructions of the application 106 implemented through the memory, processor, and additional components of the user device 102. The storage of information by the application 106 on the user device 102 can be accomplished using any suitable database system/technique. For example, the functions, systems, processes, and the like described herein are implemented using software and database structures and operations of the type generally known in the art running on computing equipment of the type generally known in the art. Databases of the type described herein can, for example, refer to either a body of data, a relational database management system (RDBMS), or to both. A database can, for example, include any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

With respect to the databases described herein, several database related operations are described such as querying databases, comparing entries between databases, adding entries to databases for established values, adding information to an existing database of a type not already recorded in the database, creating new databases, reading from databases, and the like. To carry out these functions any suitable database operators, instructions, requests, functions, programs, code, or the like known to one skilled in the art can be used. For example, databases may be operated using structed query language (SQL) and operations can be carried out using clauses (e.g., constituent components of statements and queries), expressions (e.g., commands to produce either scalar values, or tables consisting of columns and rows of data), predicates (e.g., that specify conditions that can be evaluated to SQL three-valued logic true/false/unknown or Boolean truth values and are used to limit the effects of statements and queries, or to change program flow), queries (e.g., that retrieve that data based on specific criteria), statements (e.g., that have a persistent effect on schemata and data, or may control transactions, program flow, connections, sessions, or diagnostics), or the like. In should be understood that regardless of the particular implementation of a database and the corresponding programming language, data can be written to, read from, manipulated, compared, or otherwise processed using known data processing techniques and associated known programming techniques.

Figure 7:
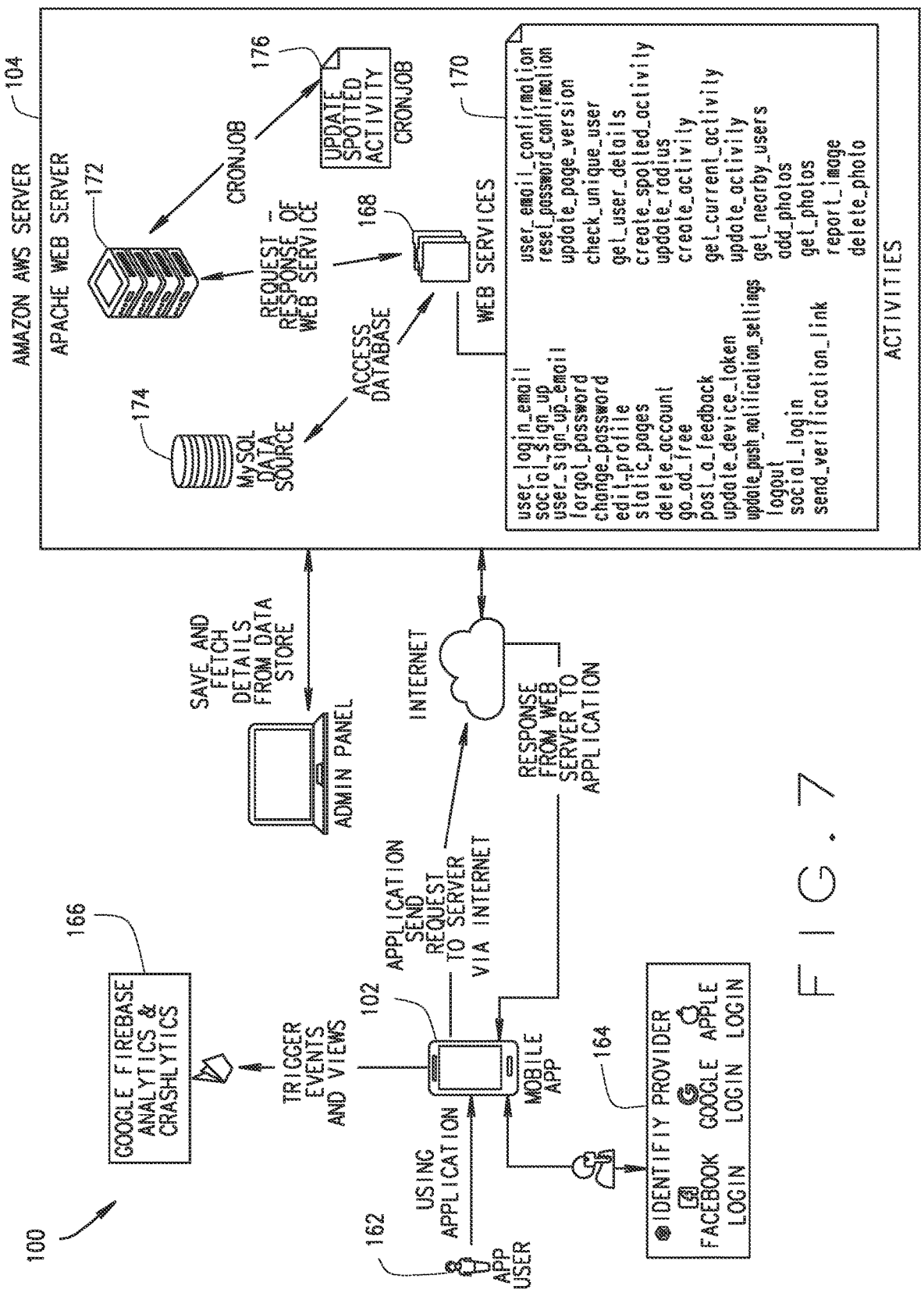
FIG. 7 is a schematic illustration showing the relationship between user devices and a server for providing a system of networked communication devices for providing recreation activity safety.

Referring now to FIG. 7, a schematic illustration shows the relationship between user devices 102 and a server 104 for providing a system of networked communication devices for providing recreation activity safety. The users 162 interact with the system 100 through the application 106 running on their user device 102. In order to provide a unique identification for each user, each user 162 has a unique login/username. For example, the user 162 can create a unique username and password using any suitable technique with the information being stored on the server 104 for authentication. As another example, the user 162 can create and use an account using an identity provider 164 of a suitable type know to those of skill in the art. This can include Facebook® Login, Google® Login, Apple® Login, or the like. These services are employed using suitable techniques including internet communication with corresponding APIs and the servers provided by such services for authenticated login. Communication can be carried out using suitable wireless communication equipment and internet communication protocols (e.g., hypertext transfer protocol, HTTP, HTTPS).

The application 106 can also communicate (e.g., using HTTP and the components and equipment described herein along with any suitable techniques) with Google® Firebase Analytics & Crashlytics servers 166 for providing analytic and application crash handling services of the types known to those of skill in the art. This communication can further provide libraries, assets, or the like for providing the application 106.

Each application 106 and user device 102 also communicates with the server 104 through internet communication (e.g., using a cellular data connection and HTTP protocols of the type described herein). This communication allows for the communication of messages, information, and instructions of the type described herein. The server 104 is any suitable server or plurality of servers suitable for providing the functions described herein. For example, the server 104 is one or more Amazon® Web Services servers. The server 104 executes web services 168 to facilitate the functions of the server and system 100 described herein. This includes executing a plurality of programming functions 170 that provide the functionality and operation described herein. Some of the functions 170 are shown in greater detail in Appendix A.

The server 104 uses individual web servers 172 (e.g., Apache® Web Servers) that execute the web services and associated functions. In doing so, the server 104 (e.g., using individual web servers 172) stores, modifies, accesses, transmits, and otherwise performs operations on and using data stored in a database 174 housed in memory on the server(s) 172. For example, the database 174 uses MySQL™, a structured query language (SQL) format, or any other suitable database structure and language/operations. The server(s) 172 also execute one or more functions 176 for providing the spotted activity functions described herein with reference to FIG. 4. This function can be run periodically using a CronJob to schedule execution. Alternatively, the server can be updated as previously described herein upon submission of a spotted activity.

Examples of the type of communication between each user device 102 and the server 104 including the parameters, methods, request format, and response format are provided in Appendix B. These are the communications processed by the webservices identified as functions 170. The requests are generated by the application 106 running on each respective user device 106 as explained herein (e.g., requests are generated in response to actions such as starting the application, starting an activity, the application determining that the respective user device 102 has moved more than a predetermined amount from the last reported location, etc.). The responses are provided by the server 104 to the application 106 through the respective user device 102 after the request has been processed as described herein. The application 106 running on the user device 102 generates requests for communicating with the server 104 and handles responses or instructions from the server 104 by executing corresponding functions according to the programming of the application 106 to carry to provide the functionality described herein. Some of these functions executed by the application 106 using the respective user device 102 are provided in Appendix C. An example of a database schema for the database 174 used by server 104 is provided in Appendix D.

Figure 8:
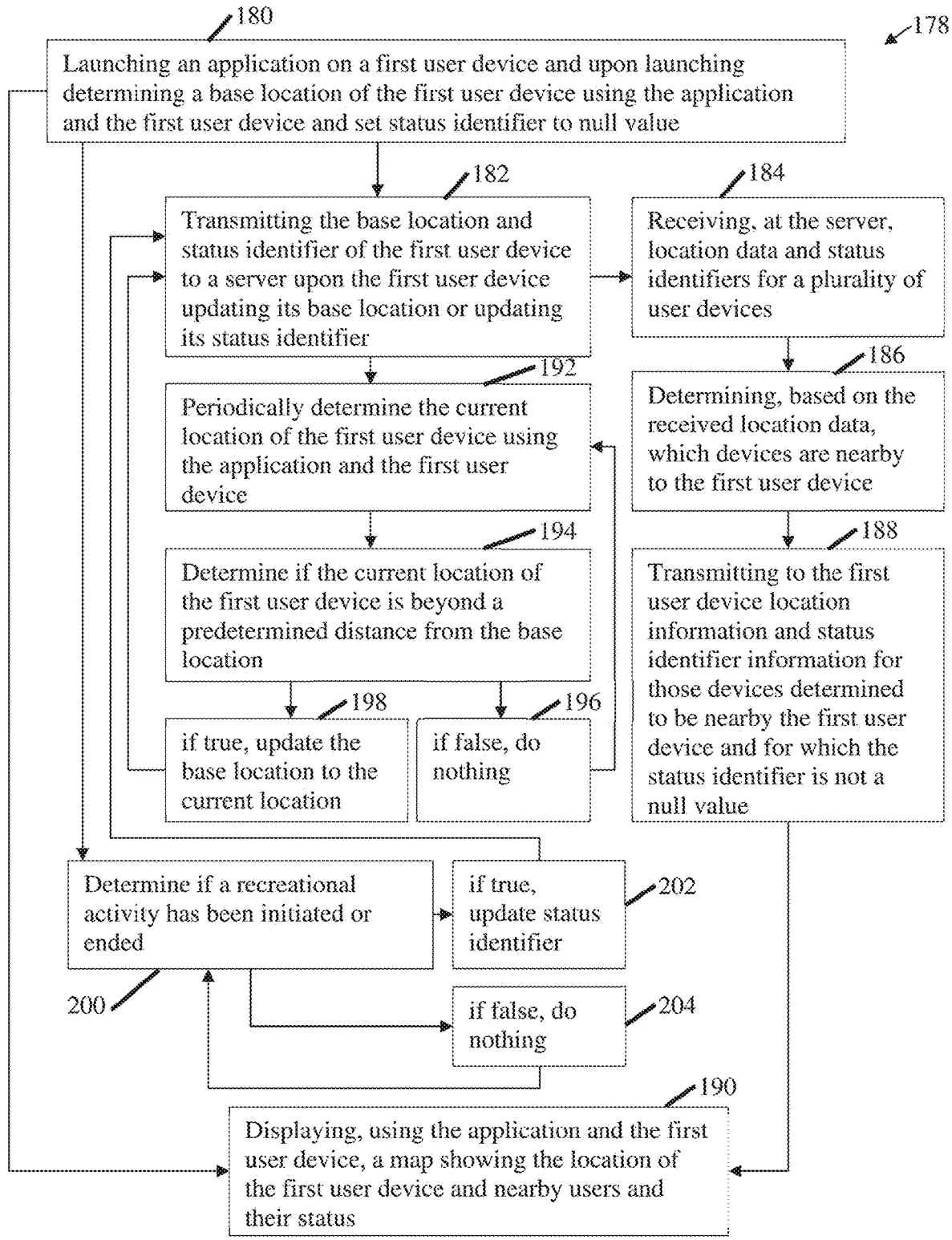
FIG. 8 is a flowchart illustrating some steps of a method for providing a system of networked communication devices for providing recreation activity safety.

Referring now to FIG. 8, a flowchart illustrates some steps of a method 178 for providing a system 100 of networked user devices 102 (networked with server 104) for providing recreation activity safety. In step 180 a user launches an application 106 on a first user device 102 and upon launching the application determines a base location (e.g., initial location) of the first user device 102 using the application 106 and the first user device 102. The application also sets a status identifier (i.e., activity status identifier) to a null value. The application 106 determines the base location by instructing the first user device 102 to determine the location, for example, by requesting location information from a GPS system using a dedicated or integrated GPS chip onboard the user device 102. The application 106 is launched by a user by the user selecting the application using the operating system running on the user device 102. The application 106 sets the activity status identifier by updating a value stored locally in a database on the first user device 102 memory maintained by application 106. The application 106 likewise stores the base location in memory (e.g., in a database). The location is stored as latitude and longitude values.

In step 182, the first user device 102 transmits the base location and activity status identifier to the server 104 upon the first user device 102, by the application 106, updating its base location or updating its activity status identifier. Thus, on startup of the application 106 when both values are updated, the application 106 using the first user device 102 transmits the location information and the activity status identifier value to the server 104. The location information and activity status identifier are transmitted using the equipment of the first user device 102 described herein (e.g., a cellular chip and antenna enabling an internet connection) and relevant communication protocols (e.g., HTTP). The communication uses the parameters and functions of type shown in Appendix B. For example, the application 106 transmits a message to the server 104 including a device identifier/application identifier such as the username of the user, latitude, longitude, and activity status identifier in the payload of the message. As can be appreciated, the HTTP protocol used for communication can result in the message including additional information (e.g., an origin address, routing instructions, a destination address, etc.). The activity status identifier and the location information can be sent as two separate messages. For example, the activity status identifier can be sent according to the examples provided in Appendix C (create_activity; get_current_activity; update-_activity) and the location information can be sent according to the examples in Appendix C (get_nearby_users). In some embodiments, the message (for either location and/or activity status) does not specifically include identification information in the payload, but rather can include identifying information in the header of the message (e.g., as an authentication token as shown in Appendix B get_nearby- 174 to retrieve stored location information for other user devices 102. The server 104 then compares this location data (e.g., latitude and longitude) to the location data for the first user device 102 to determine if the location data indicates that the other user device 102 is within a predetermined distance from the first user device 102. That predetermined distance is the radius value with a default value of one mile and which can be changed in some embodiments by the user (e.g., Appendix B update_radius; Appendix C). The server 104 queries the database with respect to the first user 102 to determine what radius value to use in determining which other user devices are nearby.

In one embodiment (e.g., shown in Appendix A), the server 104 sets the latitude and longitude received from the first user device 102 as a center and calculates a circle about the center using the radius as the predetermined distance. For example, the server can use the following code:

```
$radius = $input_params['radius'];
$lat = $input_params['latitude'];
$long = $input_params['longitude'];
$distance= "round((69.0 * DEGREES(ACOS(COS(RADIANS(".$lat.")) *
COS(RADIANS( ucce.dLatitude)) * COS(RADIANS(".$long.") - RADIANS(
ucce.dLongitude)) + SIN(RADIANS(".$lat.")) * SIN(RADIANS( ucce.dLatitude))))),2) <
$radius";
    $activity_distance= "if('elsExtended' = 'Yes','dtExtendedEndtime' >
NOW( ),'dtEndTime' > NOW( )) AND round((69.0 *
DEGREES(ACOS(COS(RADIANS(".$lat.")) * COS(RADIANS(u.dLatitude)) *
COS(RADIANS(".$long.") - RADIANS(u.dLongitude)) + SIN(RADIANS(".$lat.")) *
SIN(RADIANS(u.dLatitude))))),2) < $radius AND (' ucce'.'iUserId' !=
$input_params[user_id] AND ' ucce'.'eStatus'='Active')";
    if($input_params['user_id'] != '' && $radius == '' ){
        $this->db->select('iRadius');
            $this->db->from('users');
            $this->db->where('iUserId', $input_params['user_id']);
            $data=$this->db->get( )->result_array( );
            $radius = $data[0]['i Radius'];
            $distance= "round((69.0 * DEGREES(ACOS(COS(RADIANS(".$lat.")) *
COS(RADIANS( ucce.dLatitude)) * COS(RADIANS(".$long.") - RADIANS(
ucce.dLongitude)) + SIN(RADIANS(".$lat.")) * SIN(RADIANS( ucce.dLatitude))))),2) <
$radius" ;
            $activity_distance= "if('elsExtended' = 'Yes','dtExtendedEndtime' >
NOW( ),'dtEndTime' > NOW( )) AND round((69.0 *
DEGREES(ACOS(COS(RADIANS(".$lat.")) * COS(RADIANS(u.dLatitude)) *
COS(RADIANS(".$long.") - RADIANS(u.dLongitude)) + SIN(RADIANS(".$lat.")) *
SIN(RADIANS(u.dLatitude))))),2) < $radius AND (' ucce'.'iUserId' !=
$input_params[user_id] AND ' ucce'.'eStatus'='Active')";
        }
        $return['distance'] = $distance;
        $return['activity_distance'] = $activity_distance;
        return $return;
```

_users). The server 104 can use a database lookup using such header information to identify the corresponding first user device 102.

In step 184, the server 104 receives the location data and activity status identifier from the first user device 102 and at least one other user device 102. The server 104 receives the information in the form of the messages described herein and using the communication components and protocols described herein (e.g., an internet connection and HTTP communication protocol). The server 104 stores the received information in a database of the type described herein. The database includes at least the location information in the form of latitude and longitude and the status identifier value (e.g., jogging, bicycling, null, etc.).

In step 186, the server 104 determines based on the received location data which other user devices 102 are nearby to the first user device (i.e., the user device sending the location information to the server 104). To make this determination, the server 104 queries the server database The server 104 determines if the latitude and longitude values of the other user devices stored in the database 174 falls within the circle of predetermined distance from the first user device 102. This is simply done by numerical comparison to the range established by calculating the circle of latitude and longitude. If the other user device has a latitude and longitude within these bounds, the server 104 determines that the other user device is nearby to the first user device 102. The server 104 stores these nearby devices in an array for output.

In step 188, the server 104 transmits to the first user device 102 the location information and activity status identifier information for those other user devices 102 determined to be nearby the first user device 102 and for which the status identifier is not a null value. After determining which other user devices 102 are nearby to the first user device 102, the server 104 creates an array of location information for only those user devices 102 which have a non-null value for the activity status identifier. This can be done simultaneously with the determination of nearby users. For example, when determining which user devices 102 are nearby the first user device 102 the server only compares location data to the bounds (calculated circle based on the center from the first user device 102) if the location information is associated with a non-null activity status value in the database 174. The server 104 transmits the output array of latitude and longitude for each nearby other user device 102 to the first user device 102. The information is transmitted in a message to the first user device 102 using the components and techniques described herein (e.g., internet communication and HTTP protocol). In some embodiments, the server 104 further transmits an instruction to the first user device 102 to cause the respective application 106 to present a notification indicating the number of recreationalists found nearby (e.g., as shown in Appendix A).

In step 190, the first user device 102 using the application 106 displays a map (e.g., as shown in FIG. 1) showing the location of the first user device 102 and nearby users and their activity status. The information is received using internet communication of the type described herein. The application 106 can store the received information from the server 104 and upon receiving the information execute a function(s) in response that reads the database and displays recreationalist icons on the shown map. This type of GUI manipulation is performed using any suitable technique of the type described herein or otherwise known to one of skill in the art (e.g., positioning a bitmap mask corresponding to the appropriate icon at a screen location determined based on the location information read from the database of the user device).

Upon launching of the application in step 180, the application can also default to the map screen (shown in FIG. 1) by proceeding to step 190 as the first user device 102 and application 106 as well as the server 104 simultaneously perform the determinations and functions of steps 182-188.

In step 192, the first user device 102 as instructed by the running application 106 being executed thereon periodically determines the current location of the first user device 102. For example, the application 106 can include instructions that periodically cause the first user device 102 to engage hardware thereon to request location information from an outside source (e.g., a GPS system). The period can be predetermined, fixed, alterable by the user, informed by other data, or otherwise set. In one embodiment, the application 106 executes a loop while running that includes a timer to periodically cause the first user device 102 to determine its location and report the information to the application 106. For example, the timer can be 5 seconds, 1 minute, 5 minutes, 10 minutes, or the like. In one preferred embodiment, the user device the period is thirty (30) seconds. It has been determined through experimentation that this period balances battery and data use in acquiring location information with accuracy in tracking the location of the first user device 102 given the speed of a typical recreationalist (e.g., a jogger or bicyclist). In some embodiments, the application 106 adjusts the period between requests for location information based on inertial navigation data. For example, the application 106 monitors the respective user device 102 equipment such as accelerometers, timer, inclinometers, gyroscopes, and the like to estimate an amount of movement of the respective user device 102. If the respective user device 102 is determined by the application 106, using inertial navigation systems and techniques, to have moved more than a predetermined distance (e.g., 3 meters, 5 meters, 10 meters, or the like), the application 106 preempts the timer based periodic request for location information and immediately requests location information (e.g., from GPS systems). Even if the device is not determined to have moved, the application 106 continues to periodically (i.e., based on a timer) cause the respective user device 102 to determine its location by communicating with external systems (e.g., GPS systems). In a further embodiment, a similar procedure is carried out using cell tower triangulation.

In step 194, the application 106 determines if the current location of the first user device 102 (determined as explained above) is beyond a predetermined distance from the base location. The application 106 stores the base location in memory and the determined location in memory as well. In the preferred embodiment, both the base location and the current location as stored as latitude and longitude. The application 106 determines the distance between the current location and the base location by comparing the two coordinate pairs using any suitable calculation. For example, the calculation can be:

```
function getDistanceFromLatLonInKm(lat1 ,lon1 ,lat2,lon2) {
    var R = 6371; // Radius of the earth in km
    var dLat = deg2rad(lat2 - lat1); // deg2rad below
    var dLon = deg2rad(lon2 - lon1);
    var a =
        Math.sin(dLat/2) * Math.sin(dLat/2) +
        Math.cos(deg2rad(lat1)) * Math.cos(deg2rad(lat2)) *
        Math.sin(dLon/2) * Math.sin(dLon/2)
        ;
    var c = 2 * Math.atan2(Math.sqrt(a), Math.sqrt(1 - a));
    var d = R * c; // Distance in km
    return d;
}
function deg2rad(deg) {
    return deg * (Math.PI/180)
}
```

The application 106 compares the distance between the base location and the current location, i.e., the distance travelled, to the predetermined distance using a simple magnitude comparison. In some embodiments, the predetermined distance is controllable by the user and can be updated based on preferences (e.g., set using a GUI input in the application and stored in memory). In alternative embodiments, the predetermined distance is fixed. In the preferred embodiment, the predetermine distance is 10 meters. Through experimentation it has been found that a 10 meter distance provides for sufficient accuracy given the speeds of recreationalists and others using the application not in an active mode (e.g., a motorist monitoring for nearby recreationalists) to provide for advanced warning while simultaneously balancing the data processing, communication, and battery resource usage of the system 100.

In step 196, if the application 106 determines that the distance between the base location and the current location is not greater than the predetermined distance, the application does nothing. The application 106 restarts the loop of periodically determining the current location of the first user device 102 (e.g., resets to step 192).

In step 198, if the application 106 determines that the distance between the base location and the current location is greater than the predetermined distance, the application 106 updates the value of the base location such that it is then equal to the current location value. The application 106 then proceeds back to step 182 and because the base location has been updated, the application 106 executes step 182 (e.g., by transmitting the base location and activity status identifier to the server 104).

Steps 192-198 can be performed by the first user device 102 and application 106 at the same time as other steps are being performed (e.g., as steps 184-190 are being performed). This allows the application 106 to cause the map displaying nearby users to continuously update.

In step 200, the application 106 determines if a recreational activity has been initiated through an input from a user. The application 106 continuously makes this determination as the determination is made in response to receiving an input (e.g., button push) from a user. In this manner, step 200 is performed simultaneously as the other steps described. The application 106 determines if a recreational activity has been initiated by executing a loop that determines is a corresponding button of the type previously described has been interacted with. The application 106 in this step also continuously makes the determination if a recreational activity has been ended (e.g., through expiry of a timer 128 or user interaction with an end button 130 as shown in FIG. 3).

In step 202, if the application 106 does determine that a recreational activity has been initiated (e.g., start button 124 of FIG. 2 has been interacted with), the application 106 updates the activity status identifier with the value provided by the user (e.g., through buttons 118, 120 of FIG. 2.) If the application 106 does determine that a recreational activity has been ended, the application 106 updates the activity status identifier to a null value. Upon updating the activity status identifier, in either case, the application proceeds to step 182 where the application 106 causes the first user device 102 to transmit to the server 104 the base location and activity status identifier. In this way, the server 104 updates the activity status identifier to the null value in its database and the first user device 102 is no longer presented on the maps of other user devices 102 when those devices receive updated information form the server 104.

If the application 106 does not determine that there has been a change in the activity status, the application 106 in step 204 does nothing. The application then continues to determine if the recreational activity has changed (e.g., returns to step 200).

In alternative embodiments, the application 106 sends activity status identifier updates independent of location information. The activity status identifier is updated upon the occurrence of the events previously described (e.g., the initiation or ending of an activity). For example, the application can communicate according to create_activity, get_current_activity, and update_activity shown in Appendix B. The application 106 can handle activity related functions as described herein using as shown in Appendix C.

The method 178 is performed in parallel for all user devices 102 where in those instances the user device would not be the first user device but rather the second, third, and so on. In this way, all user devices 102 communicate with the server 104 to provide location and activity status information so that the server 104 can return to each user device 102 appropriate information for the display of nearby and active users of respective other user devices 102.

It should be understood from the preceding description that the system 100 described provides significant benefits and improvements. The system 100 provides for improved recreationalist safety through the sharing of information including the position of active recreationalists. The system 100 also improves the operation of the computing of networked devices for sharing location information. As explained, this is achieved by only sharing location information for active devices (those engaged in recreational activity) and sharing that information only to nearby devices. This reduces the amount of data that needs to be communicated between devices and servers. Furthermore, the system 100 improves operation of the computing devices used in the system by splitting duties between user devices 102 and the servers 104 and limiting the amount of location information received by the server 104. The user device 102 determines its location independently and only provide updated location information to the server 104 once the change in location has reached a predetermined threshold. This operation limits the amount of data and communication handled by user devices 102 and the server 104 thus improving efficiency and speeding up calculation. The server 104 handles the determination of which user devices 102 are nearby which provides for less calculation and communication between user devices 102 themselves (e.g., as would be the case in a distributed or peer to peer system). In this manner, the amount of data communicated by each user device 102 is reduced thereby improving calculation speeds and reducing data transmission needs.

It should further be understood that changes can be made in the above constructions without departing from the scope of the disclosure. It is intended that all matter contained in the above description or shown in the accompanying drawings shall be interpreted as illustrative and not in a limiting sense.

I claim:

1. A method for providing information sharing among a plurality user devices for improving recreationalist safety through networking of the user devices, the method comprising:

determining an initial location of a first user device of the plurality of user devices, using an application running on the first user device, the application querying a global positioning system device included within the first user device to receive an initial location datum comprising a latitude and a longitude indicative of the initial location of the first user device;

transmitting the initial location datum and an activity status identifier from the first user device to a remotely located server;

receiving, at the server, the initial location datum and the activity status identifier, the server storing the initial location datum and the activity status identifier along with a user identifier in a database;

determining, using the server and based on the received initial location datum, which other user devices of the plurality of user devices are nearby the first user device and have a non-null activity status identifier;

transmitting to the first user device location information and activity status identifier information for the other user devices determined by the server to be nearby the first user device and the non-null activity status identifier value;

receiving from the server at the first user device the location information and activity status identifier information for the other user devices determined by the server to be nearby the first user device and have the non-null activity status identifier; and displaying, using the first user device and the application running thereon, a map showing an icon corresponding to a user of the first user device and the initial location of the first user device and icons corresponding to the activity status identifier and location information of the those user devices determined by the server to be nearby the first user device, and have the non-null activity status identifier.

2. The method in accordance with claim 1 further comprising transmitting the initial location datum and an activity status identifier of the first user device to the server upon the first user device and the application running thereon updating its initial location datum or updating its status identifier.

3. The method in accordance with claim 2 further comprising periodically determining the current location of the first user device using the application and the first user device and setting a current location datum comprising an updated latitude and longitude indicative of the current location of the first user device.

4. The method in accordance with claim 3 further comprising:
   determining, using the application and the first user device, if the current location of the first user device is beyond a predetermined distance from the initial location datum by comparing the initial location datum and the current location datum; and
   in response to determining that the current location of the first user device is beyond the predetermined distance from the initial location datum, updating the initial location datum to the values of the current location datum.

5. The method in accordance with claim 4 further comprising:
   determining, using the application and the first user device, if a recreational activity has been initiated or ended;
   in response to determining that the recreational activity has been initiated, setting, using the application and the first user device, a locally stored value of the activity status identifier to a value corresponding to the type of activity initiated; and
   in response to determining that a recreational activity has been ended, setting, using the application and the first user device, the locally stored value of the activity status identifier to a null value.

6. The method in accordance with claim 5 wherein the application determines that a recreational activity has been initiated based on a graphical user interface input provided by the user indicating that a recreational activity has been initiated and providing information about the type of activity initiated corresponding to one of a plurality of possible values for the activity status identifier.

7. The method in accordance with claim 6 wherein the application sets a timer when a recreational activity is initiated by a user based on an activity time provided by the user when initiating the recreational activity.

8. The method in accordance with claim 7 wherein the application determines that a recreational activity has been ended in response to the timer set when a user initiates the recreational activity has elapsed.

9. The method in accordance with claim 8 wherein the application determines that a recreational activity has been ended in response to receiving a graphical user interface input corresponding to the user manually ending the recreational activity.

10. The method in accordance with claim 9 wherein periodically determining the current location of the first user device comprises querying a global positioning system at regular intervals.

11. The method in accordance with claim 1 wherein the other user devices function in the same manner as the first user device.

12. The method in accordance with claim 1 further comprising setting the activity status identifier of the first user device, using the application running thereon, to a null value upon startup of the application.

13. The method in accordance with claim 1 wherein the user identifier comprises one or more of an authentication token, a username, or a device address.

14. The method in accordance with claim 1 wherein determining, using the server and based on the received location data, which other user devices are nearby the first user device and have a non-null activity status identifier comprises:
   querying the database to identify entries for user identifiers which are associated with a non-null activity status identifier and retrieving the corresponding longitude and latitude values;
   calculating a distance between the first user device and the identified entries based on the received corresponding longitude and latitude values and the initial location datum received from the first user device;
   comparing the calculated distance for each identified entry to a predetermined distance; and
   for each comparison in which the calculated distance is less than the predetermined distance, placing at least the longitude and latitude and a corresponding activity status identifier in an array for transmission to the first user device.

* * * * *